Nov. 2, 1954     S. LUDWIG ET AL     2,693,372
AUTOMOBILE RADIO ANTENNA MOUNTING
Filed June 2, 1951     2 Sheets-Sheet 1
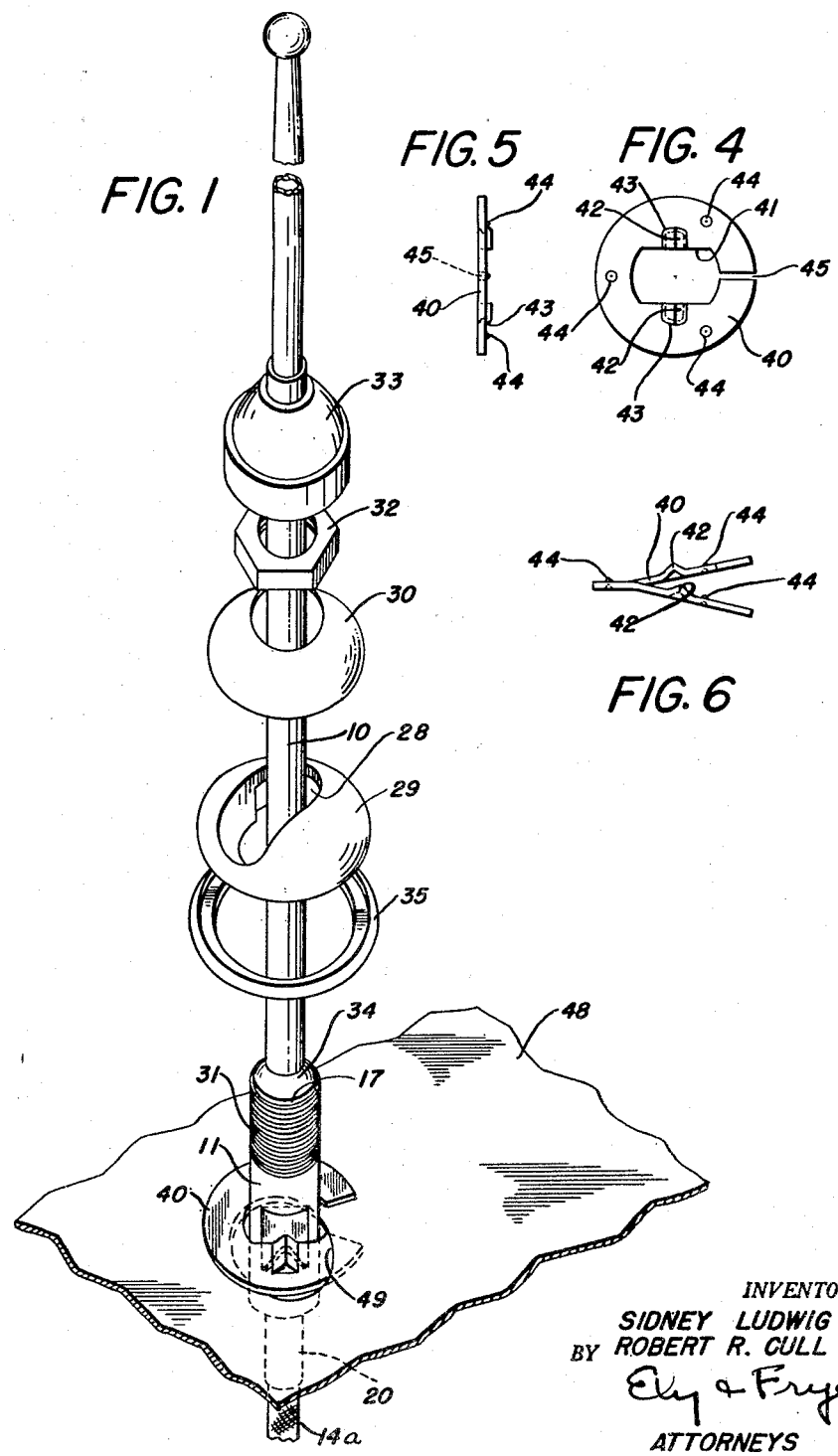
INVENTORS
SIDNEY LUDWIG &
BY ROBERT R. CULL
ATTORNEYS Nov. 2, 1954
S. LUDWIG ET AL
2,693,372
AUTOMOBILE RADIO ANTENNA MOUNTING
Filed June 2, 1951
2 Sheets-Sheet 2
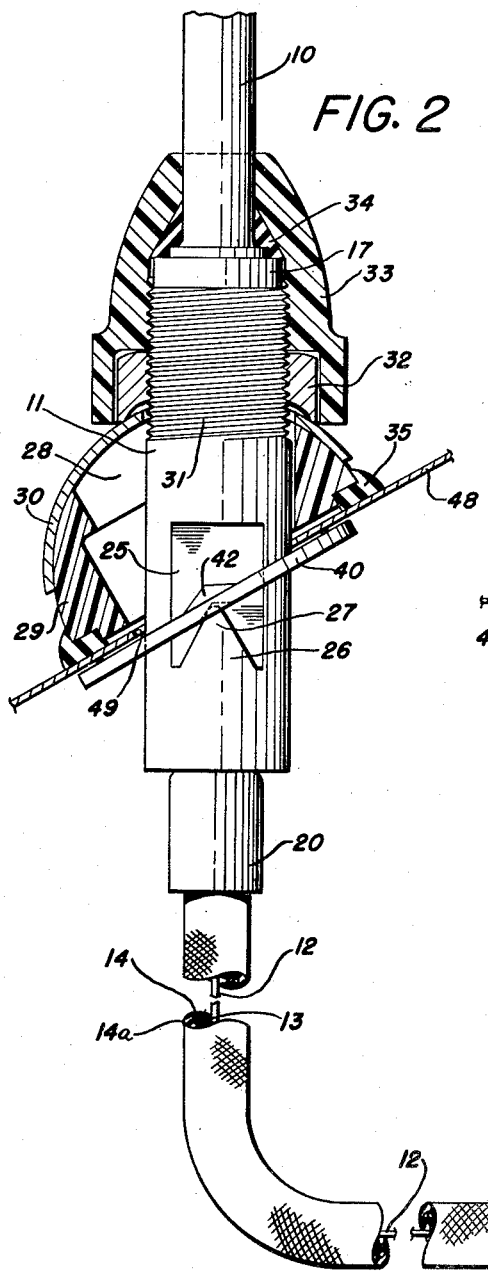
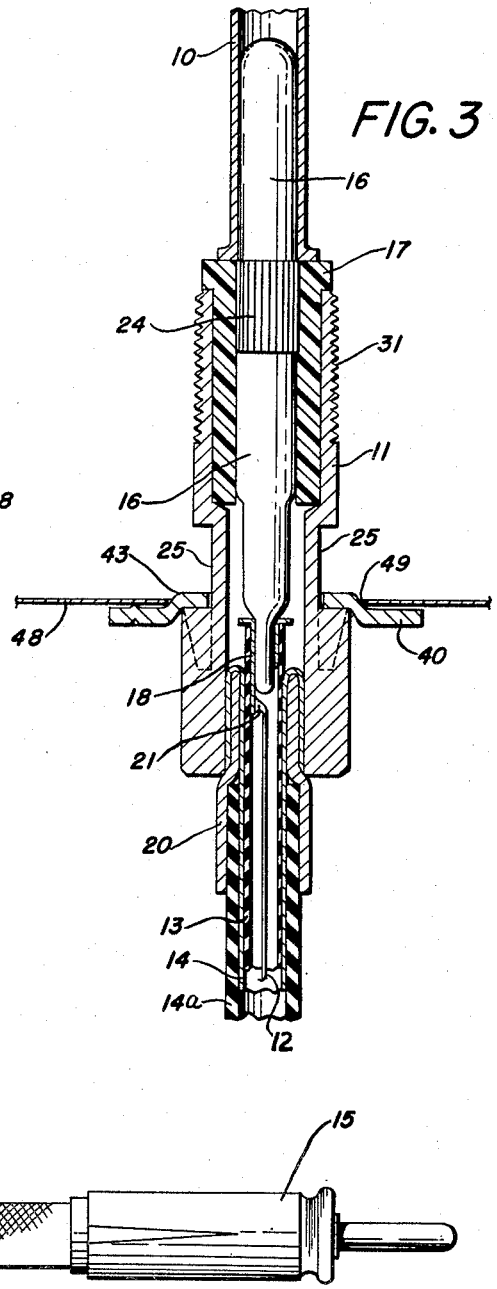
INVENTORS
SIDNEY LUDWIG &
ROBERT R. CULL
BY Ely & Frye
ATTORNEYS

United States Patent Office 2,693,372
Patented Nov. 2, 1954

2,693,372

AUTOMOBILE RADIO ANTENNA MOUNTING

Sidney Ludwig, Cleveland Heights, and Robert R. Cull, Brecksville, Ohio

Application June 2, 1951, Serial No. 229,628

3 Claims. (Cl. 285—30)

This invention relates to an automobile radio antenna and more particularly to an automobile radio antenna support adapted to be quickly and positively mounted from the outside on any desired surface of a car body and at any desired angle to that surface.

The need of providing a practical automobile antenna support which can be mounted entirely from the outside of the automobile has been recognized for many years. Among other obvious advantages such mountings may be installed or substituted by a retail dealer or purchaser without the necessity of replacing or patching upholstery covering otherwise inaccessible undersurfaces such as the automobile roof. If the mountings and antennas are installed on the automobile production line, considerable time and labor cost are saved by eliminating the necessity for working in the relatively inaccessible interiors of fenders, cowls and similar locations. Moreover, scheduling of assembly operations is simplified since antenna installation need not be meshed with other assembly operations to insure that initially accessible interiors on various automobile models remain unenclosed by panels, upholstery or similar items at the time the antenna is to be installed.

Heretofore a number of attempts have been made to provide a practical automobile antenna support which may be mounted from the outside of the automobile. These devices comprise toggle arms, swinging links or similar complicated and structurally delicate members which are adapted to be inserted with the antenna base through a relatively large hole in the automobile surface and then "expanded" or moved relative to the antenna base to effect engagement with the underside of the automobile surface adjacent the edges of the hole. This procedure involves delicate and skillful manipulating through the hole which is partially occupied by the antenna base. The installation becomes very tricky and vexing if centering shoulders or lugs designed to mate with the edge of the hole are provided on the assembly since these must be juggled into place blindly. If such centering means are not provided the mounting is free to slip or slide in its hole. These outside mounted supports do not provide for adjustable angular positioning of the antenna relative to the automobile surface, and assemblies must therefore be specially designed for a particular location on a particular car model. Moreover, the necessarily small pivotal connections on toggle types do not provide the rugged mounting which is required to hold the relatively long antenna securely despite the continuous and severe vibration and shocks to which the assembly is subjected in service. The pins of some pivoted connections on toggle types must be passed through the antenna base sleeve in order to provide some modicum of structural strength, but this interferes with proper insulation of the antenna circuit. Furthermore, the pivoted arm supports generally do not provide suitable grounding of the antenna lead since they prevent a positive electrical bond between the antenna cable shield and the vehicle body. The pivoted arm supports engage the underside of the mounting surface only at two diametrically opposite points adjacent the rim of the hole and they, therefore, do not give firm support in all directions but tend to readily relax and loosen. Some of the present outside mounted supports require very large holes which structurally weaken and tend to disfigure and dimple the automobile surface.

Accordingly, an object of the present invention is to provide an automobile antenna support which may be quickly and conveniently mounted and centered from the outside of the vehicle without any tools and without the necessity of manipulation through the hole provided for the support after the antenna base has been inserted in the hole and without the necessity of centering by "feel" rather than by sight.

Another object is the provision of an automobile antenna support which may be mounted from the outside of the vehicle and which may be selectively angularly positioned with respect to the mounting surface.

A further object is the provision of an automobile antenna support which is of simple and sturdy construction, and which, when in position, positively centers the mounting in the associated hole, firmly anchors the mounting to the associated surface, and provides a low resistance electrical bond between the antenna shield and the vehicle body.

An additional object is the provision of an automobile antenna mounting which grips the mounting surface around the entire periphery of the hole provided for the mounting to render firm support in all directions.

Other and further objects and advantages of this invention will appear from the following specifications and claims and from the drawings in which:

Figure 1 is an isometric view of the support partially inserted in an associated hole in the vehicle surface, with the elements remaining to be tightened exploded along the lower antenna element.

Figure 2 is an elevation, partly in cross section, of the tightened assembly in position on an associated vehicle surface.

Figure 3 is a cross section of the antenna base sleeve taken from a position 90° removed from Figure 2.

Figure 4 is a top view of the support washer in its closed or planar position.

Figure 5 is a side elevation of the washer shown in Figure 4.

Figure 6 is a side elevation of the support washer taken 90° from the direction of Figure 5 but showing the washer in its open position before it has been tightened against the underside of the vehicle surface.

In the drawings the invention is shown in association with a telescoping antenna 10 which is connected through a metallic sleeve 11 to a lead wire 12. The lead is of conventional construction with the insulating sleeve 13, the flexible shielding 14, the outer casing 14A and the plug-in jack 15.

A plug or stud 16 is pressed into the lower end of the antenna 10. A polystyrene or other suitable insulating sleeve 17 is pressed into the sleeve 11 and receives the stud 16 with a tight press fit which may be made very secure by provision of the knurls 24 on the stud. The stud extends through the hollow interior of the sleeve 11 and is received in a resilient female clip or socket 18 received in the top end of the insulating sleeve 13. The lead wire 12 passes through a small hole at the bottom of the socket 18 and is bonded thereto by a drop of solder 21. The flexible shielding 14 is bent back over the top of a grounding sleeve 20 which is pressed into the bottom of the sleeve 11 and which is slightly flared at its lower end to receive and clamp the end of the outer casing 14A.

The sleeve 11 has a pair of flat parallel sides 25 formed thereon. Extending upwardly along each flat side 25 are a pair of shoulders 26 terminating in fulcrum points 27. These fulcrum points 27 are adapted to bear against the support washer 40 which will be more fully described below.

When the mounting assembly is tightened into position, the sleeve 11 passes through an opening 28 in the arcuate or half ball member 29 and through the cover or "dressing" shell 30 and the threads 31 on the top end of the sleeve 11 receive the tightening nut 32 and the cover nut 33. The cover nut 33 "dresses" the top of the assembly and preferably includes a sealing insert 34 which seals the remainder of the assembly from rainwater or other moisture which may tend to seep down the sides of the antenna 10. The opening 28 has the form of an off-center slot on the upper surface of the member 29 and a centrally located opening at the bottom of this member. The member 29 preferably rests on an annular rubber pad and is itself comprised of a relatively soft material such as tenite which may be bitten into by the shell 30 to aid in holding the assembly against rotation in its final tightened position.

The support washer 40 is most clearly illustrated in Figures 4 and 5. The inner rim of the washer is formed to include two flat shoulders 41 which have upwardly extending indents 42 struck therefrom. The outer ends of the indents 42 comprise upstanding shoulders 43. A plurality of sharp upwardly extending projections 44 are preferably formed around the surface of the support washer. The support washer is preferably split between the flat shoulders 41 as at 45 and is initially partially opened as shown in Figure 6.

The open support washer 40 is slipped on the sleeve 11 with the flat shoulders 41 engaging the flat sides 25 so that the washer is keyed for rotation with the antenna 10 and base 11. With the remaining mounting members loosely distributed along the antenna 10 as in Figure 1, the assembly is ready for installation on the vehicle surface 48 having a hole 49 drilled therein. The diameter of this hole is smaller than the outside diameter of the washer 40. After the plug 15 and the associated lead cable have been passed through the hole 49, the end of the sleeve 11 is partially inserted and held at one side of the hole with the washer 40 passing under the edge of the hole as shown in Figure 1. After a twist of the antenna 10, the entire washer will fall through and be located below the surface 48. The hole 49 is just wide enough to mate with the shoulders 43 and these shoulders may be visually positioned in mating relationship with the edge of the hole by simply moving the sleeve 11 to the center of the hole and raising it slightly. Grasping the antenna 10 to hold the sleeve in its raised position, the remaining mounting members are dropped over the sleeve and the nut 32 is tightened. Prior to final tightening of the nut the assembly is turned and positioned at the desired angle. The nut 32 is then drawn tight to finally position the assembly and to completely close the split washer. The cover nut 33 is then threaded into place to compress the rubber seal 34 and complete the assembly.

It will be noted that the indents 42 ride on the fulcrum points 27 and these elements cannot become misaligned with each other due to the keying between the washer shoulders 41 and the sleeve sides 25. The washer 40 and the sleeve 11 remain free to assume any relative angular position with respect to each other until the nut 32 is finally tightened to clamp the parts in place. The projections 44 on the washer bite into the underside of the surface 48 and the fulcrum points 27 bite into the underside of the washer indents 42 so that a good grounding connection between the surface 48 and the cable shield 14 is attained through the grounding sleeve 20, the sleeve 11, the collar 26 and the washer 40.

The washer 40 furnishes a very sturdy and simple under-support for the mounting assembly. As will be clear from the above, the installation of the mounting is very simple and may be very quickly effected. A particular embodiment of the invention designed for commercial production has been illustrated, but it will be apparent that many details of the specific mounting may be changed without departing in substance from the teaching of the invention. Accordingly, the scope of the invention is to be limited solely by the following claims.

What is claimed is:

1. In an antenna mounting, an antenna base member adapted to extend through an opening in a wall, a split support washer surrounding said member and keyed therewith against relative rotation, fulcrum means carried by said member below said support washer for tiltably restraining said member from passing upwardly entirely through said washer, means having an upward arcuate bearing surface and an elongated opening, said last named means surrounding said sleeve above said washer and threaded means threaded to said member above said arcuate means to urge said fulcrum means and said support washer toward said arcuate means in clamping relationship.

2. An antenna base comprising a sleeve adapted to extend through an opening in a wall, at least one flat sided outside slot intermediate the ends of said sleeve, fulcrum means fixed to said sleeve at one end of said slot, a split washer surrounding said sleeve and having indents formed thereon, the aperture of said washer being complementary to the slotted portion of the sleeve, said indents pivotally receiving said fulcrum means, the radially outward ends of said indents forming shoulders engageable with the edge of said opening, and clamping means near the other end of said slot to draw said fulcrum means against said washer, said washer surrounding said sleeve at said slotted portion.

3. In an antenna mounting, an antenna base member adapted to extend through an opening in a wall, a split support washer surrounding said member, fulcrum means on said member below said support washer for tiltably restraining said member from passing upwardly entirely through said washer, means having an upward arcuate bearing surface and an elongated opening, said last named means surrounding said sleeve above said washer and threaded means threaded to said member above said arcuate means to urge said fulcrum means and said support washer toward said arcuate means in clamping relationship, whereby insertion of said base member and a split end of said washer in said wall opening and the turning of said split washer in said opening will permit said washer to pass through said wall from the outside thereof and, thus, allow said wall to be clamped between said washer and said arcuate means and also allow said base member to be mounted at a fixed angular position with respect to said wall.

References Cited in the file of this patent

UNITED STATES PATENTS

| Number | Name | Date |
|--------|------|------|
| 988,743 | Stillwaggon | Apr. 4, 1911 |
| 1,403,813 | Pinto | Jan. 17, 1922 |
| 1,797,766 | Frye | Mar. 24, 1931 |
| 2,454,897 | Trowbridge | Nov. 30, 1948 |
| 2,509,563 | Grashow | May 30, 1950 |
| 2,596,780 | Meyers et al. | May 13, 1952 |

FOREIGN PATENTS

| Number | Country | Date |
|--------|---------|------|
| 495,682 | Great Britain | Nov. 17, 1938 |